(12) United States Patent
Brooks et al.

(10) Patent No.: US 6,195,241 B1
(45) Date of Patent: *Feb. 27, 2001

(54) ARCING FAULT DETECTION SYSTEM

(75) Inventors: Stanley J. Brooks, Rockvale, TN (US); James W. Dickens; Walt Strader, both of Lexington, KY (US)

(73) Assignee: Squares D Company, Palatine, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/814,754

(22) Filed: Mar. 7, 1997

Related U.S. Application Data

(60) Division of application No. 08/600,512, filed on Feb. 13, 1996, now Pat. No. 5,682,101, which is a continuation-in-part of application No. 08/402,678, filed on Mar. 13, 1995, now abandoned, and a continuation-in-part of application No. 08/402,600, filed on Mar. 13, 1995, now abandoned, and a continuation-in-part of application No. 08/402,575, filed on Mar. 13, 1995, now abandoned, and a continuation-in-part of application No. 08/403,084, filed on Mar. 13, 1995, now abandoned, and a continuation-in-part of application No. 08/403,033, filed on Mar. 13, 1995, now abandoned.

(51) Int. Cl.[7] ....................................... H02H 3/00
(52) U.S. Cl. ............................................... 361/42
(58) Field of Search ................................. 361/42, 46–50, 361/65, 76, 78, 79, 80, 86–89, 93; 324/76.41–76.45, 520–522, 541, 544; 364/481, 482, 483, 487; 702/FOR 104–FOR 106, FOR 110

(56) References Cited

U.S. PATENT DOCUMENTS

| | | | |
|---|---|---|---|
| H536 | 10/1988 | Strickland et al. | 324/456 |
| Re. 30,678 | 7/1981 | Van Zeeland et al. | 361/44 |
| 2,808,566 | 10/1957 | Douma | 324/127 |

(List continued on next page.)

FOREIGN PATENT DOCUMENTS

| | | | |
|---|---|---|---|
| 0 094 871 A1 | 5/1983 | (EP) | H02H/1/00 |
| 0 615 327 | 9/1994 | (EP) | H02H/1/00 |
| 0 649 207 A1 | 4/1995 | (EP) | H02H/1/00 |
| 0 748 021 A1 | 12/1996 | (EP) | H02H/1/00 |
| 0 762 591 A2 | 3/1997 | (EP) | H02H/3/33 |
| 0 802 602 A2 | 10/1997 | (EP) | H02H/1/00 |
| 0813281 | 12/1997 | (EP) . | |
| 2 177 561 | 6/1985 | (GB) | H02H/3/00 |
| 2285886A | 7/1995 | (GB) | H01H/71/74 |
| WO 97/30501 | 8/1997 | (WO) | H02H/1/00 |

OTHER PUBLICATIONS

Antonio N. Paolantonio, P.E., Directional Couplers, R.F. Design, Sep./Oct., 1979, pp. 40–49.

(List continued on next page.)

Primary Examiner—Ronald W. Leja
(74) Attorney, Agent, or Firm—Kareem M. Irfan; Larry I. Golden

(57) ABSTRACT

A system to detect arcing faults in an electrical distribution system with a line conductor connected to a utility power transformer. The system monitors the rate of change of electrical current in the line conductor and produces a signal which represents the rate of change. The system produces a pulse each time the rate-of-change signal exceeds a selected threshold, filters the rate-of-change signal and/or the pulses to substantially eliminate a signal or pulse which represents changes in the electrical current outside a selected frequency range, monitors the remaining pulses to detect when the number of pulses that occur within a selected time interval exceeds a predetermined threshold, and generates an arc-fault-detection signal in response to the occurrence of a number of pulses which exceed the threshold within the selected time interval.

17 Claims, 7 Drawing Sheets

U.S. PATENT DOCUMENTS

| | | | |
|---|---|---|---|
| 2,832,642 | 4/1958 | Lennox | 299/132 |
| 2,898,420 | 8/1959 | Kuze | 200/87 |
| 3,471,784 | 10/1969 | Arndt et al. | 324/126 |
| 3,538,241 | 11/1970 | Rein | 174/143 |
| 3,588,611 | 6/1971 | Lambden et al. | 317/31 |
| 3,600,502 | 8/1971 | Wagenaar et al. | 174/143 |
| 3,622,872 | 11/1971 | Boaz et al. | 324/52 |
| 3,684,955 | 8/1972 | Adams | 324/72 |
| 3,746,930 | 7/1973 | Van Best et al. | 317/31 |
| 3,775,675 | 11/1973 | Freeze et al. | 324/51 |
| 3,812,337 | 5/1974 | Crosley | 235/153 AC |
| 3,858,130 | 12/1974 | Misencik | 335/18 |
| 3,869,665 | 3/1975 | Kenmochi et al. | 324/72 |
| 3,878,460 | 4/1975 | Nimmersjo | 324/52 |
| 3,911,323 | 10/1975 | Wilson et al. | 317/18 |
| 3,914,667 | 10/1975 | Waldron | 317/36 |
| 3,932,790 | 1/1976 | Muchnick | 317/18 D |
| 3,939,410 | 2/1976 | Bitsch et al. | 324/72 |
| 4,052,751 | 10/1977 | Shepard | 361/50 |
| 4,074,193 | 2/1978 | Kohler | 324/126 |
| 4,081,852 | 3/1978 | Coley et al. | 361/45 |
| 4,087,744 | 5/1978 | Olsen | 324/51 |
| 4,156,846 | 5/1979 | Harrold et al. | 324/158 |
| 4,169,260 | 9/1979 | Bayer | 340/562 |
| 4,214,210 | 7/1980 | O'Shea | 455/282 |
| 4,245,187 | 1/1981 | Wagner et al. | 324/54 |
| 4,251,846 | 2/1981 | Pearson et al. | 361/30 |
| 4,264,856 | 4/1981 | Frierdich et al. | 322/25 |
| 4,316,187 | 2/1982 | Spencer | 340/664 |
| 4,354,154 | 10/1982 | Olsen | 324/51 |
| 4,356,443 | 10/1982 | Emery | 324/51 |
| 4,387,336 | 6/1983 | Joy et al. | 324/51 |
| 4,459,576 | 7/1984 | Fox et al. | 336/84 |
| 4,466,071 | 8/1984 | Russell, Jr. | 364/492 |
| 4,616,200 | 10/1986 | Fixemer et al. | 335/35 |
| 4,639,817 | 1/1987 | Cooper et al. | 361/62 |
| 4,642,733 | 2/1987 | Schacht | 361/118 |
| 4,644,439 | 2/1987 | Taarning | 361/87 |
| 4,652,867 | 3/1987 | Masot | 340/638 |
| 4,658,322 | 4/1987 | Rivera | 361/37 |
| 4,697,218 | 9/1987 | Nicolas | 633/882 |
| 4,702,002 | 10/1987 | Morris et al. | 29/837 |
| 4,707,759 | 11/1987 | Bodkin | 831/642 |
| 4,771,355 | 9/1988 | Emery et al. | 361/33 |
| 4,810,954 | 3/1989 | Fam | 324/142 |
| 4,833,564 | 5/1989 | Pardue et al. | 361/93 |
| 4,835,648 | 5/1989 | Yamauchi | 361/14 |
| 4,845,580 | 7/1989 | Kitchens | 361/91 |
| 4,853,818 | 8/1989 | Emery et al. | 361/33 |
| 4,858,054 | 8/1989 | Franklin | 361/57 |
| 4,866,560 | 9/1989 | Allina | 361/104 |
| 4,882,682 | 11/1989 | Takasuka et al. | 364/507 |
| 4,893,102 | 1/1990 | Bauer | 335/172 |
| 4,901,183 | 2/1990 | Lee | 361/56 |
| 4,922,368 | 5/1990 | Johns | 361/62 |
| 4,931,894 | 6/1990 | Legatti | 361/45 |
| 4,939,495 | 7/1990 | Peterson et al. | 337/79 |
| 4,949,214 | 8/1990 | Spencer | 361/95 |
| 4,969,063 | 11/1990 | Scott et al. | 361/93 |
| 5,010,438 | 4/1991 | Brady | 361/56 |
| 5,047,724 | 9/1991 | Boksiner et al. | 324/520 |
| 5,051,731 | 9/1991 | Guim et al. | 340/638 |
| 5,121,282 | 6/1992 | White | 361/42 |
| 5,166,861 | 11/1992 | Kron | 316/379 |
| 5,168,261 | 12/1992 | Weeks | 324/424 |
| 5,179,491 | 1/1993 | Runyan | 316/45 |
| 5,185,684 | 2/1993 | Beihoff et al. | 361/45 |
| 5,185,685 | 2/1993 | Tennie et al. | 361/45 |
| 5,185,686 | 2/1993 | Hansen et al. | 361/45 |
| 5,185,687 | 2/1993 | Beihoff et al. | 361/45 |
| 5,206,596 | 4/1993 | Beihoff et al. | 324/536 |
| 5,208,542 | 5/1993 | Tennies et al. | 324/544 |
| 5,223,795 | 6/1993 | Blades | 324/536 |
| 5,224,006 | 6/1993 | MacKenzie et al. | 361/45 |
| 5,257,157 | 10/1993 | Epstein | 361/111 |
| 5,280,404 | 1/1994 | Ragsdale | 361/113 |
| 5,286,933 | 2/1994 | Pham | 324/424 |
| 5,307,230 | 4/1994 | MacKenzie | 361/96 |
| 5,334,939 | 8/1994 | Yarbrough | 324/424 |
| 5,353,014 | 10/1994 | Carroll et al. | 340/638 |
| 5,359,293 | 10/1994 | Boksiner et al. | 324/544 |
| 5,363,269 | 11/1994 | McDonald | 361/45 |
| 5,383,084 | 1/1995 | Gershen et al. | 361/113 |
| 5,388,021 | 2/1995 | Stahl | 361/56 |
| 5,396,179 | 3/1995 | Domenichini et al. | 324/546 |
| 5,412,526 | 5/1995 | Kapp et al. | 361/56 |
| 5,414,590 | 5/1995 | Tajali | 361/669 |
| 5,420,740 | 5/1995 | MacKenzie et al. | 361/45 |
| 5,424,894 | 6/1995 | Briscall et al. | 361/45 |
| 5,434,509 | 7/1995 | Blades | 324/536 |
| 5,444,424 | 8/1995 | Wong et al. | 335/172 |
| 5,446,431 | 8/1995 | Leach et al. | 335/18 |
| 5,448,443 | 9/1995 | Muelleman | 361/111 |
| 5,452,223 | 9/1995 | Zuercher et al. | 364/483 |
| 5,459,630 | 10/1995 | MacKenzie et al. | 361/45 |
| 5,477,150 | 12/1995 | Ham, Jr. et al. | 324/536 |
| 5,481,235 | 1/1996 | Heise et al. | 335/18 |
| 5,483,211 | 1/1996 | Carrodus et al. | 335/18 |
| 5,485,093 | 1/1996 | Russell et al. | 324/522 |
| 5,493,278 | 2/1996 | MacKenzie et al. | 340/638 |
| 5,506,789 | 4/1996 | Russell et al. | 364/492 |
| 5,510,946 | 4/1996 | Franklin | 361/56 |
| 5,512,832 | 4/1996 | Russell et al. | 324/522 |
| 5,519,561 | 5/1996 | Mrenna et al. | 361/105 |
| 5,531,617 | 7/1996 | Marks | 439/723 |
| 5,546,266 | 8/1996 | Mackenzie et al. | 361/93 |
| 5,561,605 | 10/1996 | Zuercher et al. | 364/483 |
| 5,568,371 | 10/1996 | Pitel et al. | 363/39 |
| 5,578,931 | 11/1996 | Russell et al. | 324/536 |
| 5,590,012 | 12/1996 | Dollar | 361/113 |
| 5,602,709 | 2/1997 | Al-Dabbagh . | |
| 5,608,328 | 3/1997 | Sanderson | 324/529 |
| 5,657,244 | 8/1997 | Seitz | 364/492 |
| 5,659,453 | 8/1997 | Russell et al. | 361/93 |
| 5,682,101 | 10/1997 | Brooks et al. | 324/536 |
| 5,691,869 | 11/1997 | Engel et al. | 361/42 |
| 5,701,110 | 12/1997 | Scheel et al. | 335/132 |
| 5,706,154 | 1/1998 | Seymour | 361/42 |
| 5,729,145 | 3/1998 | Blades | 324/536 |
| 5,805,397 | 9/1998 | MacKenzie | 361/42 |
| 5,805,398 | 9/1998 | Rae | 361/42 |
| 5,815,352 | 9/1998 | Mackenzie | 361/42 |
| 5,818,237 | 10/1998 | Zuercher et al. | 324/536 |
| 5,818,671 | 10/1998 | Seymour et al. | 361/42 |
| 5,835,319 | 11/1998 | Welles, II et al. | 361/5 |
| 5,835,321 | 11/1998 | Elms et al. | 361/45 |

OTHER PUBLICATIONS

Alejandro Duenas, J., Directional Coupler Design Graphs For Parallel Coupled Lines and Interdigitated3 dB Couplers, RF Design, Feb., 1986, pp. 62–64.

RV4145 Low Power Ground Fault Interrupter, Preliminary Product Specificatons of Integrated Circuits, Raytheon Company Semiconductor Divison, 350 Ellis Street, Mountain View CA 94309–7016, pp. 1–8. No Date.

Jean–Francois Joubert, Feasibility of Main Service Ground–Fault Protection On The Electrical Service To Dwelling Units, Consultants Electro–ProtectionIns., 1980, Michelin St., Laval, Quebec H7L 9Z7. Oct. 26, 1990, pp. 1–77.

R.D. Russell, Detection Of Arcing Faults On Distribution–Feeders, Texas A & M Research Foundation, Box H. College Station, Texas 77843, Final Report Dec., 1982, pp. 1–B18.

ARCING FAULT DETECTION SYSTEM

CROSS-REFERENCE TO RELATED APPLICATIONS

This application is a divisional of application Ser. No. 08/600,512, filed Feb. 13, 1996, entitled "ARCING FAULT DETECTION SYSTEM," now U.S. Pat. No. 5,682,101, which is a continuation-in-part of applications Ser. No. 08/402,678, filed Mar. 13, 1995, entitled "DEVICE AND METHOD FOR BLOCKING SELECTED ARCING FAULT SIGNALS," now abandoned; Ser. No. 08/402,600, filed Mar. 13, 1995, entitled "VOLTAGE SENSING ARCING FAULT DETECTOR AND METHOD," now abandoned; Ser. No. 08/402,575, filed Mar. 13, 1995, entitled "ARCING FAULT DETECTION SYSTEM AND METHOD," now abandoned; Ser. No. 08/403,084, filed Mar. 13, 1995, entitled "DEVICE AND METHOD FOR TESTING ARCING FAULT DETECTORS," now abandoned; and Ser. No. 08/403,033, filed Mar. 13, 1995, entitled "CURRENT SENSING ARCING FAULT DETECTOR AND METHOD," now abandoned.

Each of the above applications has the same assignee as the present invention, and each is incorporated herein by reference in its entirety.

FIELD OF THE INVENTION

The present invention relates to the protection of electric circuits and, more particularly, to the detection of hazardous arcing faults typically ignored by conventional circuit interrupters.

BACKGROUND OF THE INVENTION

The electrical systems in residential, commercial and industrial applications usually include a panelboard for receiving electrical power from a utility source. The power is then routed through overcurrent protection devices to designated branch circuits supplying one or more loads. These overcurrent devices are typically circuit interrupters such as circuit breakers and fuses which are designed to interrupt the electrical current if the limits of the conductors supplying the loads are surpassed. Interruption of the circuit reduces the risk of injury or the potential of property damage from a resulting fire.

Circuit breakers are a preferred type of circuit interrupter because a resetting mechanism allows their reuse. Typically, circuit breakers interrupt an electric circuit due to a disconnect or trip condition such as a current overload or ground fault. The current overload condition results when a current exceeds the continuous rating of the breaker for a time interval determined by the trip current. The ground fault trip condition is created by an imbalance of currents flowing between a line conductor and a neutral conductor such as a grounded conductor, a person causing a current path to ground, or an arcing fault to ground.

Arcing faults are commonly defined as current through ionized gas between two ends of a broken conductor, between two conductors supplying a load, or between a conductor and ground. A major problem results from arcing faults which do not cause the circuit breaker to trip. Arcing fault current levels may be reduced by branch or load impedance to a level below the trip curve settings of the circuit breaker. In addition, an arcing fault which does not contact a grounded conductor or person will not trip a ground fault protected circuit.

There are many conditions that may cause an arcing fault. For example, corroded, worn or aged wiring or insulation, loose connections, wiring damaged by nails or staples through the insulation, and electrical stress caused by repeated overloading, lightning strikes, etc. These faults may damage the conductor insulation and reach an unacceptable temperature. Arcing faults can cause fire if combustible materials are in close proximity.

There are also many conditions that may cause a "false" arcing fault. For example, the occurrence of an arcing fault event in one branch circuit of an electrical distribution system often causes a false arcing fault signal in another branch circuit as a series path is created between the branch circuits through a load center. As a result, circuit interrupters in more than one branch circuit are erroneously tripped. Another example is a noisy load such an arc welder, electric drill, etc. producing a high frequency disturbance in the electrical circuit which appears to be an arcing fault.

SUMMARY OF THE INVENTION

It is an object of the present invention to provide an arc fault detection system and method which reliably detects arc fault conditions ignored by conventional circuit interrupters.

Another object of the invention is to provide an arc fault detection system which can be conveniently retrofitted into existing residential, commercial and industrial facilities at minimal cost.

A further object of the invention is to provide an arc fault detection system and method which distinguishes between hazardous arc faults and normal operation of equipment or household appliances, as well as noisy loads, using the electrical circuit.

Still another object of the invention is to provide an arc fault detection system which electrically isolates multiple branch circuits in an electrical distribution system.

Other and further objects and advantages of the invention will be apparent to those skilled in the art from the present specification taken with the accompanying drawings and appended claims.

In accordance with the present invention, the foregoing objectives are realized by providing a system for detecting arcing faults in an electrical distribution system by monitoring the rate of change of electrical current in the line conductor and producing a signal representing the rate of change, producing a pulse each time the rate-of-change signal exceeds a selected threshold, filtering the rate-of-change signal and/or the pulses to substantially eliminate a signal or pulse representing changes in the electrical current outside a selected frequency range, monitoring the remaining pulses to detect when the number of pulses that occur within a selected time interval exceeds a predetermined threshold, and generating an arc-fault-detection signal in response to the occurrence of a number of pulses exceeding the threshold within the selected time interval.

DETAILED DESCRIPTION

Figure 1:
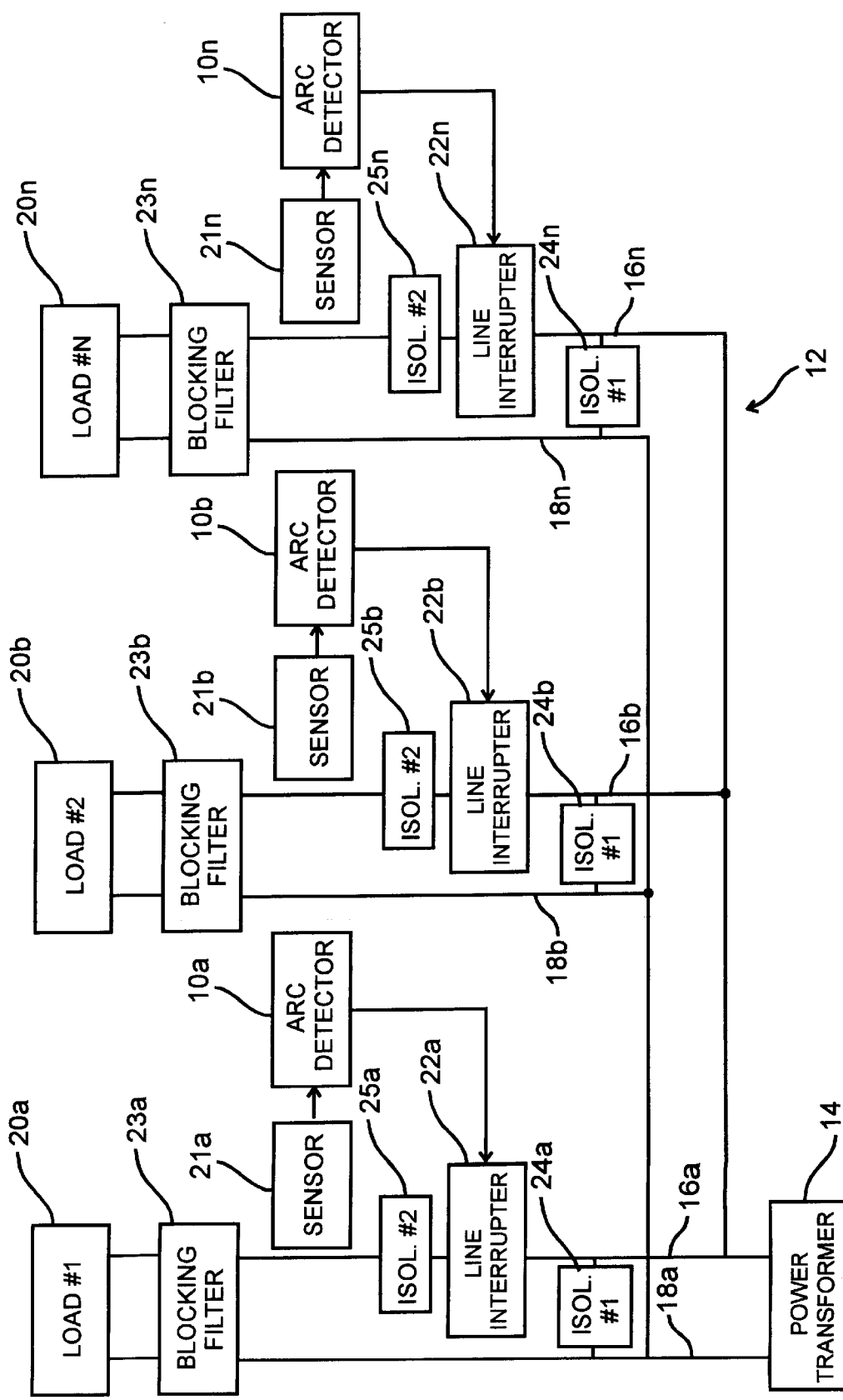
FIG. 1 is a block diagram of an arc fault detection system embodying the present invention.

Turning now to the drawings and referring first to FIG. 1, arc fault detectors 10a, 10b . . . 10n are connected to n branches of an electrical distribution system 12 having a utility company power transformer 14 as a source of electrical power. The electrical distribution system 12 includes line conductors 16a, 16b . . . 16n and neutral conductors 18a, 18b . . . 18n which distribute electrical power to loads 20a, 20b . . . 20 n through corresponding sensors 21a, 21b . . . 21n, line interrupters 22a, 22b . . . 22n, and blocking filters 23a, 23b . . . 23n. The line conductors 16 and the neutral conductors 18 are typically at 240 volts or 120 volts, and a frequency of 60 Hz.

Each of the line interrupters 22 is preferably a circuit breaker which includes an overload trip mechanism having a thermal/magnetic characteristic which trips the breaker contacts to an open circuit condition in response to a given overload condition, to disconnect the corresponding load 20 from the power source, as is known in the art. It is also known to provide the circuit breaker 22 with ground fault interrupter circuitry responding to a line or neutral-to-ground fault to energize a trip solenoid which trips the circuit breaker and opens the contacts.

The sensors 21 monitor the rate of change of electrical current in the respective line conductors 16 and produce signals representing the rate of change. The rate-of-change signal from each sensor 21 is supplied to the corresponding arc detector 10, which produces a pulse each time the rate-of-change signal increases above a selected threshold. The rate-of-change signal and/or the pulses produced therefrom are filtered to eliminate signals or pulses outside a selected frequency range. The final pulses are then monitored to detect when the number of pulses that occur within a selected time interval exceeds a predetermined threshold. In the event that the threshold is exceeded, the detector 10 generates an arc-fault-detection signal that can be used to trip the corresponding line interrupter 22.

The pattern of fluctuations in the rate-of-change signal produced by the sensor 21 indicates whether the condition of the circuit is a normal load, a normal switching event, a phase-controlled fired load, or an arcing fault event. One example of a suitable sensor for producing the desired rate-of-change is a toroidal sensor having an annular core encompassing the current-carrying load line, with the sensing coil wound helically on the core. The core is made of magnetic material such as a ferrite, iron, or molded permeable powder capable of responding to rapid changes in flux. A preferred sensor uses a ferrite core would with 200 turns of 24–36 gauge copper wire to form the sensing coil. An air gap may be cut into the core to reduce the permeability to about 30. The core material preferably does not saturate during the relatively high currents produced by parallel arcs, so that arc detection is still possible at those high current levels.

Other means for sensing the rate of change of the current in a line conductor are contemplated by the present invention. By Faraday's Law, any coil produces a voltage proportional to the rate of change in magnetic flux passing through the coil. The current associated with an arcing fault generates a magnetic flux around the conductor, and the coil of the sensor 21 intersects this flux to produce a signal. Other suitable sensors include a toroidal transformer with a core of magnetic material or an air core, an inductor or a transformer with a laminated core of magnetic material, and inductors mounted on printed circuit boards. Various configurations for the sensor core are contemplated by the present invention and include toroids which have air gaps in their body.

Preferably, the rate-of-change signal produced by the sensor 21 represents only fluctuations in the rate of change within a selected frequency band. The sensor bandpass characteristic is preferably such that the lower frequency cut-off point rejects the power frequency signals, while the upper frequency cut-off point rejects the high frequency signals generated in the presence of noisy loads such as a solder gun, electric saw, electric drill, or like appliances, equipment, or tools. The resulting output of the sensor 21 is thus limited to a selected frequency band associated with arcing faults, thereby eliminating or reducing spurious fluctuations in the rate-of-change signal which could result in nuisance tripping. As an example, the sensor bandpass characteristic may have: (1) a lower frequency cut-off point or lower limit of 60 Hz so as to reject power frequency signals, and (2) an upper frequency cut-off point or upper limit of approximately 1 MHz so as to effectively reject all high frequency signals associated with noisy loads. These specific frequency cut-off points for the sensor bandpass characteristic are by way of example only, and other appropriate frequency cut-off limits may be adopted depending upon actual frequency ranges for the power signals as well as the noisy load signals.

The desired bandpass characteristic is realized by appropriately selecting and adjusting the self-resonant frequency of the sensor. The current-type sensor is selected to have a predetermined self-resonant frequency which defines associated upper and lower frequency cut-off or roll-off points for the operational characteristics of the sensor. Preferably, the current-type sensor is designed to exhibit the desired bandpass filtering characteristic as it operates to detect the rate of change of current variations within the load line being monitored. The present invention contemplates other means for bandpass filtering the signal output within the selected frequency band. For example, a bandpass filter or a combination of filters in a circuit can be used to attenuate frequencies above or below the cut-off points for the selected frequency band.

Figure 2:
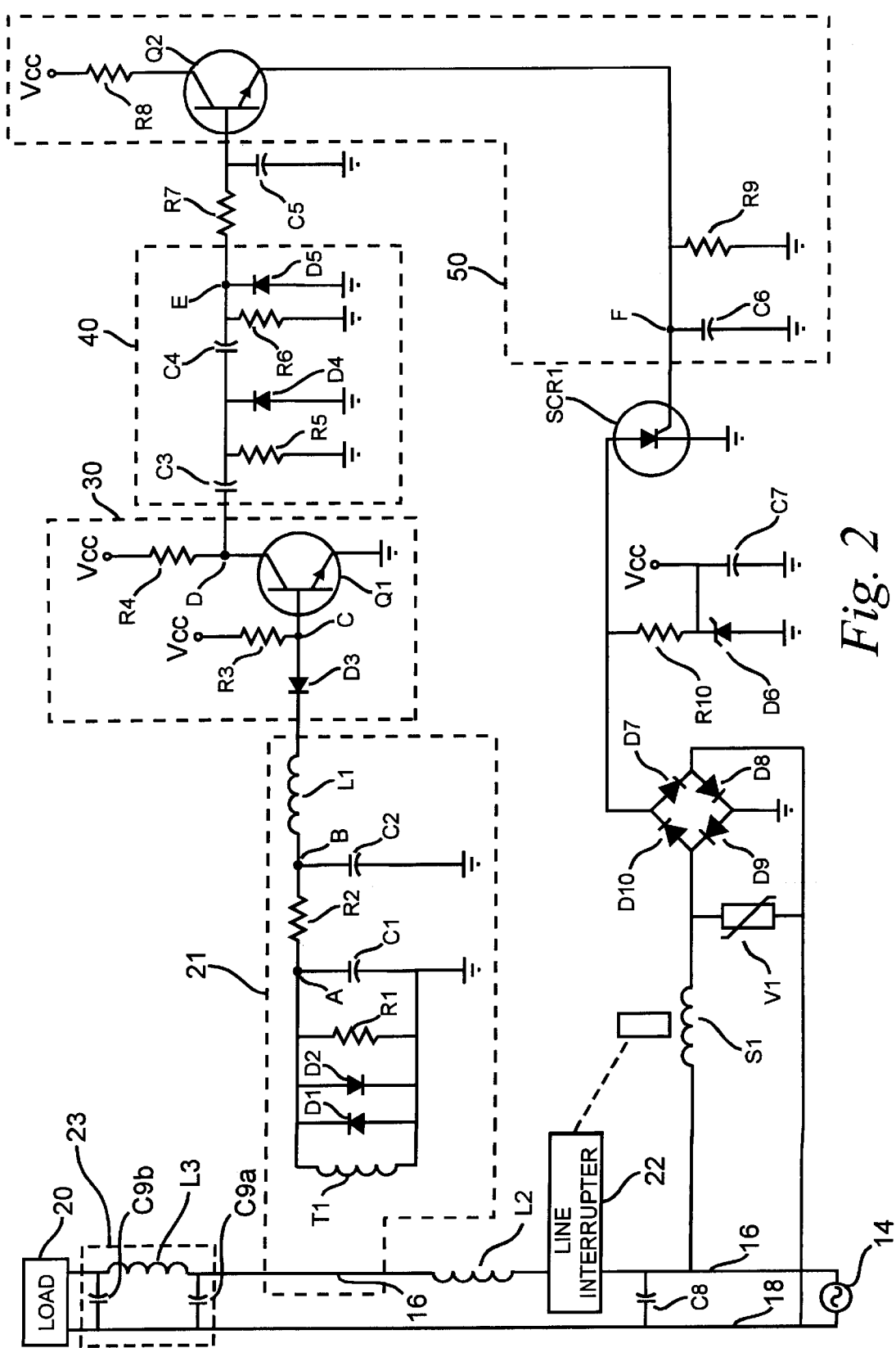
FIG. 2 is a schematic diagram of an electrical circuit for implementing the arc fault detection system illustrated in FIG. 1.

FIG. 2 illustrates a preferred circuit for one of the arc detectors 10. The sensor 21 produces the desired rate-of-change-of-current signal (commonly referred to as a "di/dt signal") in the form of an output voltage which is connected to a comparator circuit 30 through a filtering network in the sensor and a diode D3. The rate-of-change signal originates in the sensor coil T1 which is wound on a core surrounding the load line 16. Connected in parallel with the sensor coil T1 are a pair of diodes D1 and D2 which serve as clamping devices during high-power transient conditions. A resistor R1 in parallel with the diodes D1 and D2 dampens the self-ringing of the sensor, during high-power transients. A pair of capacitors C1 and C2 in parallel with the resistor R1, and a resistor R2 and an inductor L1 connected in series to the input to the comparator 30, are tuned to assist in attaining the desired rolloff characteristics of the filtering network formed thereby. For example, with the illustrative values listed below for the components of the circuit of FIG. 2, the sensor has a passband extending from about 10 KHz to about 100 KHz, with sharp rolloff at both sides of the passband.

Figure 3A:
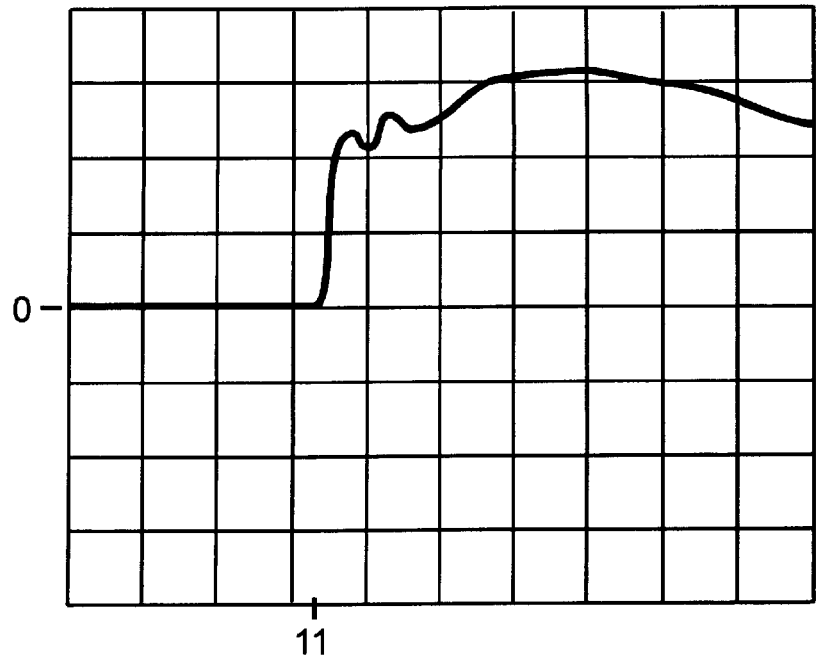
FIGS. 3a though 3g are waveforms at various points in the circuit of FIG. 2.
Figure 3B:
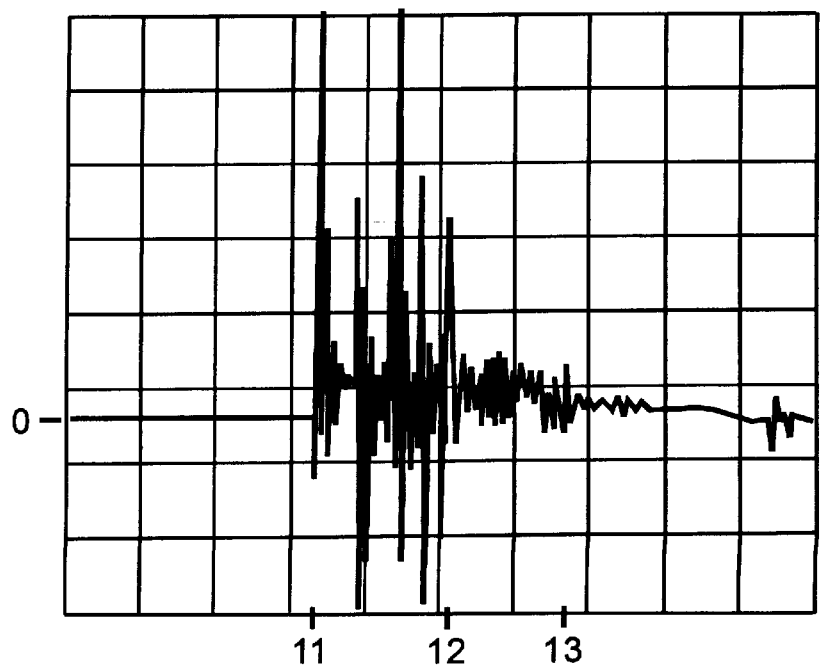

The operation of the circuit of FIG. 2 can be more clearly understood by reference to the series of waveforms in FIGS. 3a through 3g. FIG. 3a is an actual waveform from an oscilloscope connected to a line conductor 16 carrying a-c.

power at 60 Hz and experiencing a high-frequency disturbance beginning at time t1. Because the high-frequency disturbance is within the frequency range to which the sensor 21 is sensitive (e.g., from about 10 KHz to about 100 KHz), the disturbance results in a burst of high-frequency noise in the di/dt output signal (FIG. 3b) from the sensor 21 (at point A in the circuit of FIG. 2), beginning at time t1. The noise burst has a relatively high amplitude from time t1 until approximately time t2, and then continues at a lower amplitude from time t2 to about time t3.

In the comparator 30, the magnitude of the rate-of-change signal from the sensor 21 is compared with the magnitude of a fixed reference signal, and the comparator 30 produces an output voltage only when the magnitude of the rate-of-change signal crosses that of the reference signal. This causes the detector 10 to ignore low-level signals generated by the sensor 21. All signals having a magnitude above the threshold level set by the magnitude of the reference signal are amplified to a preset maximum value to reduce the effect of a large signal. In the comparator 30, a transistor Q1 is normally turned on with its base pulled high by a resistor R3. A diode D3 changes the threshold and allows only the negative pulses from the sensor 21 to be delivered to the base of the transistor Q1. When the signal to the comparator drops below the threshold level (minus 0.2 volt for the circuit values listed below), this causes the transistor Q1 to turn off. This causes the collector of the transistor Q1 to rise to a predetermined voltage, determined by the supply voltage $V_{cc}$, a resistor R4 and the input impedance of a single-shot pulse generator circuit 40. This collector voltage is the output of the comparator circuit 30. The collector voltage remains high as long as the transistor Q1 is turned off, which continues until the signal from the sensor 21 rises above the threshold level again. The transistor Q1 then turns on again, causing the collector voltage to drop. The end result is a pulse output from the comparator, with the width of the pulse corresponding to the time interval during which the transistor Q1 is turned off, which in turn corresponds to the time interval during which the negative-going signal from the sensor 21 remains below the threshold level of the comparator.

Figure 3C:
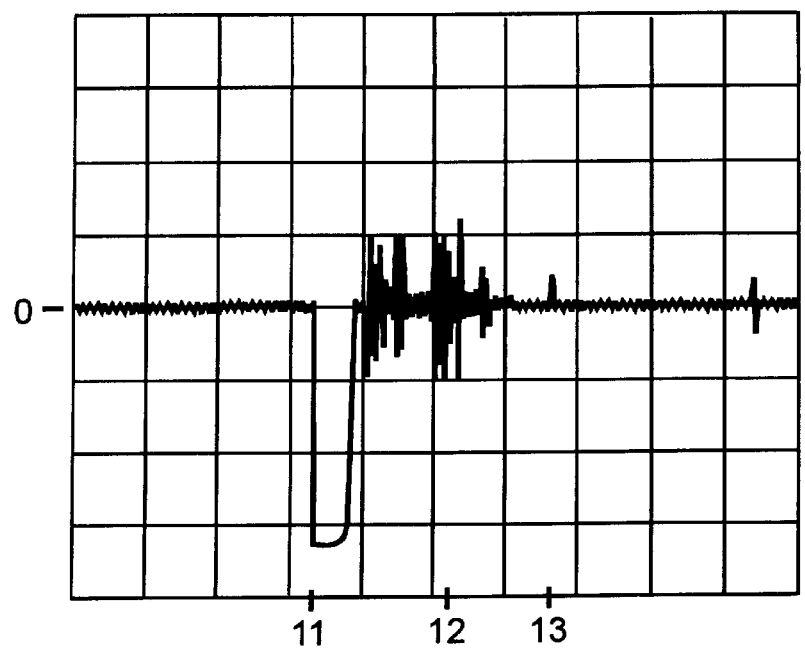
Figure 3D:
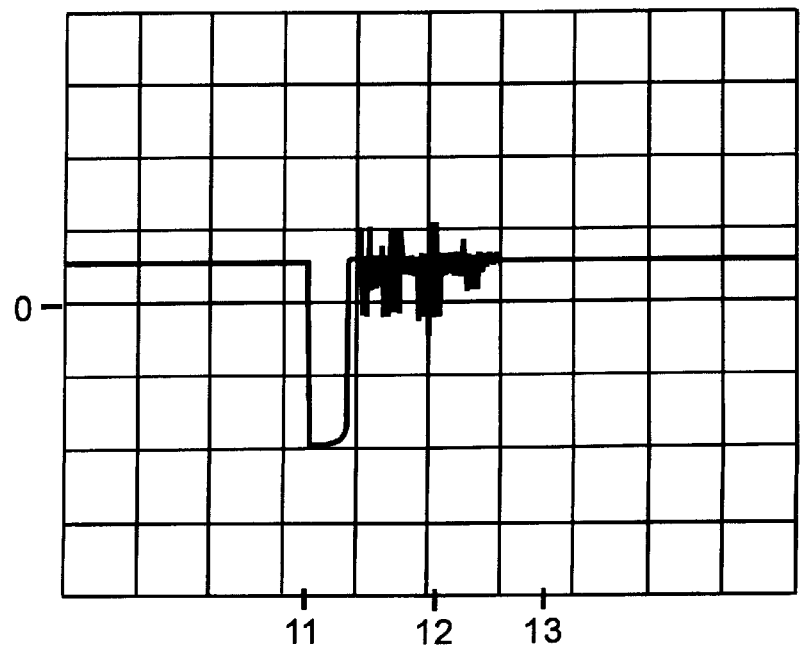

The noise burst in the sensor output is filtered to produce the waveform shown in FIG. 3c at point B in the circuit of FIG. 2. The waveform at point C in the circuit of FIG. 2 is shown in FIG. 3d, and it can be seen that the amplitude has been reduced and a d-c. offset has been introduced by summing the filtered di/dt signal with a d-c. bias from the supply voltage $V_{cc}$ at point C. This is the input signal to the base of the transistor Q1.

Figure 3E:
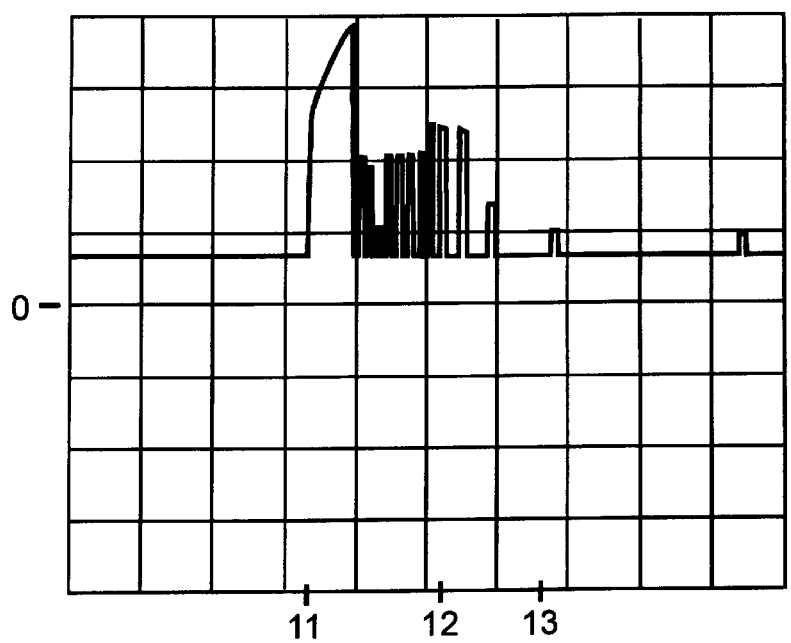

The output of the transistor Q1 is a series of positive-going pulses corresponding to the negative-going peaks in the input signal. The transistor output, at point D in the circuit of FIG. 2, is shown in FIG. 3e. It can be seen that the transistor circuit functions as a comparator by producing output pulses corresponding only to negative-going peaks that exceed a certain threshold in the filtered di/dt signal shown in FIG. 3c. At this point in the circuit, the pulses vary in both width and amplitude, as can be seen in FIG. 3e.

To convert the output pulses of the comparator 30, which vary in both width and amplitude, into a series of pulses of substantially constant width and amplitude, the comparator output is fed to a single-shot pulse generator circuit 40. This high-pass filter circuit includes a pair of capacitors C3 and C4 connected in series to the collector of the transistor Q1, and two resistor-diode pairs connected in parallel from opposite sides of the capacitor C4 to ground. The pulses produced by this circuit will be described in more detail below in connection with the waveforms shown in FIG. 3. The output pulses are predominantly pulses of equal width and amplitude, although occasional larger or smaller pulses can result from especially large or small input pulses.

Figure 3F:
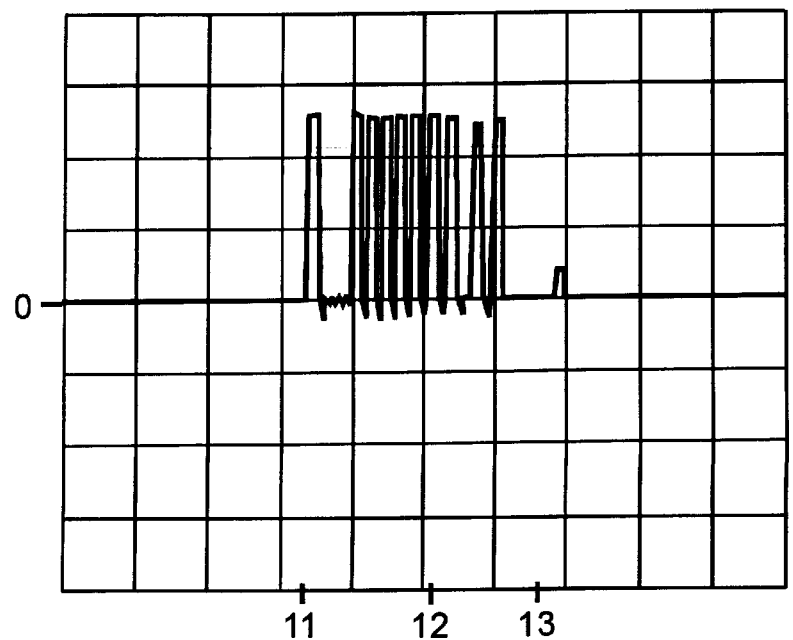

The variable-width and variable-amplitude pulses of FIG. 3e are converted to a series of pulses of substantially constant width and amplitude by the single-shot pulse generator circuit 40. The output of this circuit 40, at point E in the circuit of FIG. 2, is shown in FIG. 3f. Although all the pulses shown in FIG. 3f are of substantially the same size, larger or smaller pulses may be produced by di/dt spikes that are excessively large or excessively small. The vast majority of the pulses at point E, however, are substantially independent of the amplitude and duration of the corresponding spikes in the di/dt signal, provided the spikes are large enough to produce an output pulse from the comparator 30.

The substantially uniform pulses produced by the circuit 40 are supplied to the base of a transistor Q2 through a current-limiting resistor R7. A capacitor C5 connected from the transistor base to ground improves the sharpness of the roll-off of the bandpass filtering. The transistor Q2 is the beginning of an integrator circuit 50 that integrates the pulses produced by the circuit 40. The pulses turn the transistor on and off to charge and discharge a capacitor C6 connected between the transistor emitter and ground. A resistor R9 is connected in parallel with the capacitor C6, and a resistor R8 connected between the supply voltage and the collector of the transistor Q2 determines the level of the charging current for the capacitor C6. The magnitude of the charge on the capacitor at any given instant represents the integral of the pulses received over a selected time interval. Because the pulses are substantially uniform in width and amplitude, the magnitude of the integral at any given instant is primarily a function of the number of pulses received within the selected time interval immediately preceding that instant. Consequently, the value of the integral can be used to determine whether an arcing fault has occurred.

Figure 3G:
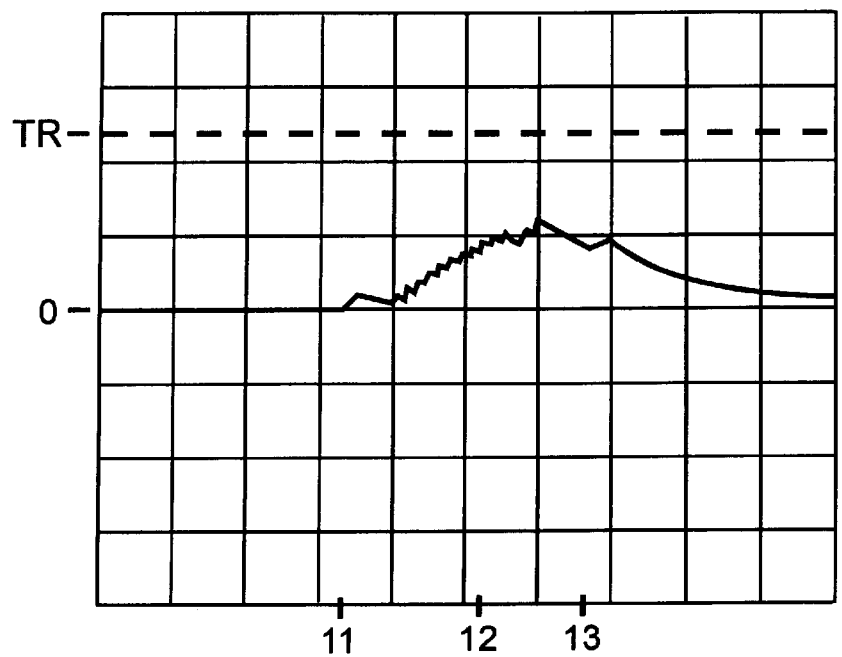

The integral signal produced by the circuit 50 is shown in FIG. 3g, taken at point F in the circuit of FIG. 2. It can be seen that the integrator circuit charges each time it receives a pulse from the circuit 40, and then immediately begins to discharge. The charge accumulates only when the pulses appear at a rate sufficiently high that the charge produced by one pulse is less than the discharge that occurs before the next pulse arrives. If the pulses arrive in sufficient number and at a sufficient rate to increase the integral signal to a trip threshold level TR (FIG. 3g), SCR1 is triggered to trip the circuit breaker. The circuit is designed so that this occurs only in response to a di/dt signal representing an arc fault.

When SCR1 is turned on, a trip solenoid S1 is energized to disconnect the load from the circuit in the usual manner. Specifically, turning on SCR1 causes current to flow from line to neutral through a diode bridge formed by diodes D7–D10, thereby energizing the solenoid to open the circuit breaker contacts in the line 16 and thereby disconnect the protected portion of the system from the power source. The d-c. terminals of the diode bridge are connected across SCR1, and the voltage level is set by a zener diode D6 in series with a current-limiting resistor R10. A varistor V1 is connected across the diode bridge as a transient suppressor. A filtering capacitor C7 is connected across the zener diode D6. The trip circuit loses power when the circuit breaker contacts are opened, but of course the contacts remain open until reset.

One example of a circuit that produces the desired result described above is the circuit of FIG. 2 having the following values:

D1 1N4148
D2 1N4148
D3 1N4148
D4 1N4148
D5 1N4148
D6 27v zener
R1 3.01K
R2 1.3K
R3 174K
R4 27.4K
R5 10K
R6 10K
R7 10K
R8 4.2K
R9 4.75K
R10 24K
L1 3300 uH
L2 500 uH
L3 500 uH
C1 0.012 uF
C2 0.001 uF
C3 0.001 uF
C4 0.001 uF
C5 0.001 uF
C6 6.8 uF
C7 1.0 uF
C8 1.0 uF
Q1 2N2222A
Q2 2N2222A
SCR1 CR08AS-12 made by POWEREX-Equal
$V_{cc}$ 27v Although a circuit breaker is the most commonly used line interrupter, the output device may be a comparator, SCR, relay, solenoid, circuit monitor, computer interface, lamp, audible alarm, etc.

It will be understood that a number of modifications may be made in the circuit of FIG. 2. For example, the discrete bandpass filter between the sensor and the comparator can be replaced with an active filter using an operational amplifier. As another example, a single-shot timer can be used in place of the single-shot pulse generator in the circuit of FIG. 2. This circuit can receive the output signal from an active filter as the trigger input to an integrated-circuit timer, with the output of the timer supplied through a resistor to the same integrator circuit formed by the resistor R9 and capacitor C6 in the circuit of FIG. 2.

Figure 4:
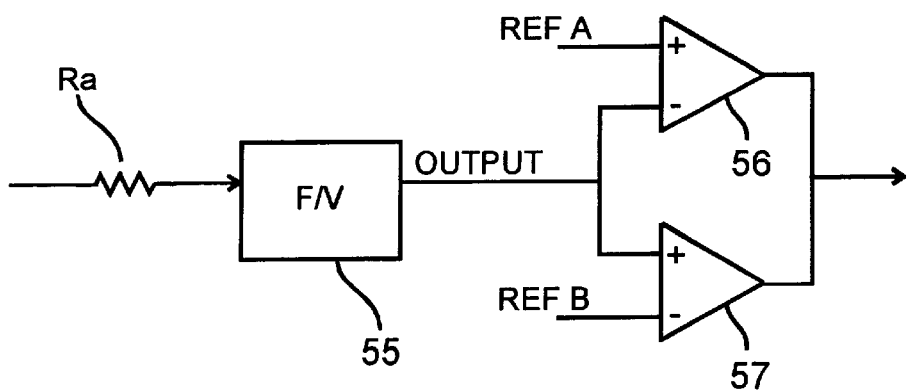
FIG. 4 is a schematic diagram of an alternative circuit for use in place of the comparator and single-shot pulse generator in the circuit of FIG. 2.

FIG. 4 illustrates a frequency-to-voltage converter circuit that can be used in place of all the circuitry between point A and the integrator circuit in FIG. 2. In this circuit, the signal from point A in FIG. 2 is supplied through a resistor Ra to a frequency/voltage converter integrated circuit 55 such as an AD537 made by Analog Devices Inc. The output of the integrated circuit 55 is fed to a pair of comparators that form a conventional window comparator. Specifically, the output of the circuit 55 is applied to the inverting input of a comparator 56 and to the non-inverting input of a comparator 57. The other inputs of the comparators 56 and 57 receive two different reference signals A and B which set the limits of the window, i.e., the only signals that pass through the window comparator are those that are less than reference A and greater then reference B.

Figure 5:
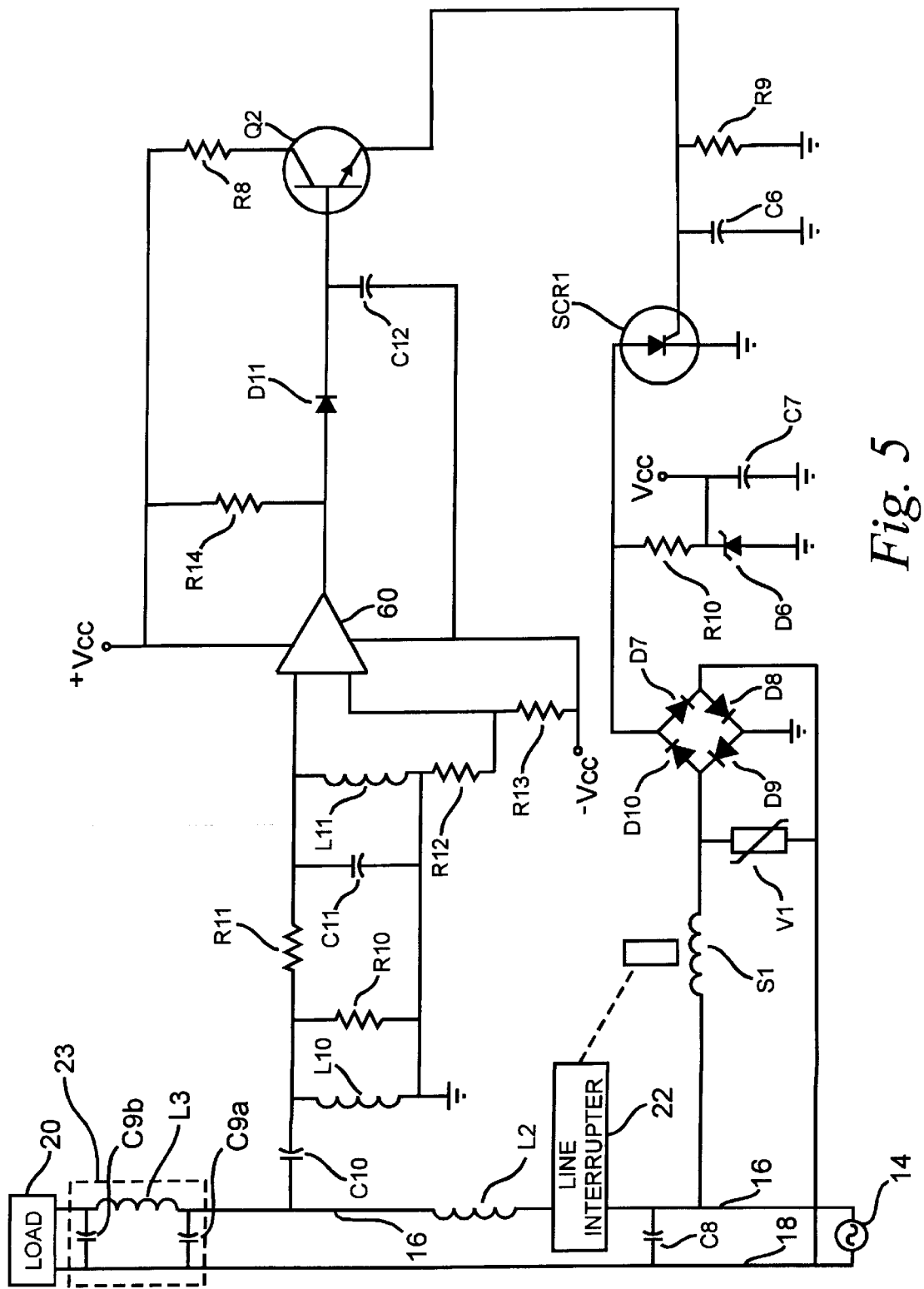
FIG. 5 is a schematic diagram of an alternative circuit for implementing the fault detection system illustrated in FIG. 1.

FIG. 5 illustrates an arc detector 10 for sensing the rate of change of the line voltage, i.e., dv/dt, rather than current. The sensor in this circuit is a capacitor C10 connected between a line conductor 16 and an inductor L10 leading to ground. The inductor L10 forms part of a bandpass filter that passes only those signals falling within the desired frequency band, e.g., between 10 KHz and 100 KHz. The filter network also includes a resistor R10, a capacitor C11 and a second inductor L11 in parallel with the first inductor L10, and a resistor R11 connected between the resistor R10 and the capacitor C11. The resistor R10 dampens the ringing between the capacitor C10 and the inductor L10, and the resistor R11 adjusts the threshold or sensitivity of the circuit. The inductors L10 and L11 provide low-frequency roll-off at the upper end of the pass band, and a capacitor C11 provides the high-frequency roll-off at the lower end of the pass band.

The capacitor C10 may be constructed by attaching a dielectric to the line buss so that the buss forms one plate of the capacitor. The second plate of the capacitor is attached on the opposite side from the buss. The sensor circuit is connected to the second plate.

The output of the bandpass filter described above is supplied to a comparator 60 to eliminate signals below a selected threshold, and to limit large signals to a preselected maximum amplitude. The filter output is applied to the inverting input of the comparator 60, through the resistor R11, while the non-inverting input receives a reference signal set by a voltage divider formed by a pair of resistors R12 and R13 connected between $V_{cc}$ and ground. The comparator 60 eliminates very low levels of signal received from the sensor. The comparator 60 is normally off when there is no arcing on the line conductor 16, and thus the comparator output is low. When the voltage signal from the sensor is more negative than the reference input (e.g., −0.2 volts), the output from the comparator goes high, and a forward bias is applied to the transistor Q2 that drives the integrator circuit. A capacitor C12 connected from the base of transistor Q2 to $-V_{cc}$ filters out high frequency noise. A diode D11 is connected between the comparator output and the base of the transistor Q2 to block negative signals that would discharge the capacitor C12 prematurely. The rest of the circuit of FIG. 5 is identical to that of FIG. 2.

When a fault occurs, it is desirable to isolate the branch of the distribution system in which the arcing fault occurred, from the rest of the distribution system. In the system of FIG. 1, using the current-type sensor, such isolation is provided by a capacitor C8 connected between the load line 16 and the neutral line 18 in each branch of the distribution system. The capacitor C8 is located between the line interrupter 22 and the power source 14 to provide a low impedance path for an arcing fault from the load line 16 to the neutral line 18, independent of the impedance of the load 20. The capacitor C8 thus prevents a series path from being created between branch circuits, even though the power transformer 14 appears as a high impedance to the high frequency current that an arcing fault generates.

The isolating capacitor C8 allows the sensor 21 to be sensitive even when all the loads are off-line and the impedance is high. As the loads come on-line, the impedance decreases. Without the isolating capacitor C8, a series path could be created between branch circuits. For example, current flow along the neutral line of a first branch circuit, within which an arcing fault is generated, could travel along the load line of the first branch circuit. The current could then continue the load line of a second branch circuit, subsequently flowing along the neutral line of the second branch circuit. The isolating capacitor C8 prevents this pathway between branch circuits from being formed.

With the voltage-type sensor shown in FIG. 5, isolation is provided by an inductor L2 in the load line 16 for each branch circuit. Each inductor L2 is located between the line interrupter 22 and the sensor 21 to provide an impedance for the current produced by an arcing fault.

The isolating capacitors C8 and the isolating inductors L2 may be used simultaneously in their respective positions in the branch circuits. This combination can be particularly useful if the sensors monitor both the current and voltage changes in the branch circuits to detect arcing faults. The arcing fault detection system also includes a blocking filter 23 in each branch circuit for blocking false arcing fault signals or other nuisance output signals generated by normal operation of the load 20. Each blocking filter 23 is connected between the sensor 21 and the load 20 in each branch circuit to prevent false arcing fault signals from being delivered to the sensor 21. As seen in FIGS. 2 and 5, the preferred blocking filter includes a pair of capacitors C9a and C9b connected between the load line 16 and the neutral line 18 of each branch circuit. An inductor L3 is connected in the load line 16 between the two capacitors C9a and C9b. Preferably, the capacitors C9a and C9b have a rating across the line of about 0.47 uF. The inductor L3 has a rating for 15 amps at 500 uH and dimensions of about 1.5" diameter and 1.313" in length (e.g. Dale IHV 15–500). These values, of course, can be adjusted for the power rating of the electrical system and the loads 20.

The capacitor C9a creates a low impedance path for any series arcing that occurs upstream of that capacitor, such as arcing within the wall upstream of a noisy load. This permits series arcing to be detected in the branch containing the blocking filter. The inductor L3 creates an impedance that does most of the attenuation of the signal created by a noisy load. This inductor is sized to carry the load current of the device, which is typically 15 or 20 amperes. The second capacitor C9b reduces the amount of inductance required in the inductor L3, by creating a low impedance path across the load 20.

One of the advantages of the blocking filter 23 is that it can be used locally on a particular branch circuit that is known to connect to a load 20 which is noisy. The expense of using the blocking filter 23 is reduced since it can be used only where needed. The blocking filter 23 also allows easy retrofitting to existing electrical distribution systems in residences and commercial space.

Although the invention has been described in connection with an ordinary 120 volt system, it is applicable to the voltages of any standard, including 12, 120, 240, 480, 600 and 18500 volts. The invention is suitable for use in residential, commercial and industrial applications, single-shot or multiphase systems and at all frequencies for a-c as well as d-c. This invention is applicable to automotive, aviation, and marine needs, separately derived sources such as generators or UPS, and capacitor banks needing incipient fault protection.

Although the present invention has been illustrated with circuit breakers, it can also be used with circuit/load monitoring devices, motor monitoring devices, receptacles, cord plugs, portable diagnostic devices, appliances, switches and fuses.

One of the many applications of the present invention is its use with ground fault circuit interrupters (GFCI's). An example of a ground fault interrupter is a fast acting circuit breaker that disconnects equipment from the power line when some current returns to the source through a ground path. Under normal circumstances all current is supplied and returned within the power conductors. But if a fault occurs and leaks some current to ground, the GFCI senses the difference in current in the power conductors. If the fault level exceeds the trip level of the GFCI, which is usually at about 6 mA, the GFCI disconnects the circuit.

Three types of GFCI are commonly available. The first or separately enclosed type is available for 120-volt, 2-wire and 12/240-volt, 3-wire circuits up to 30 amp. The second type combines a 15-, 20-, 25-, or 30-amp circuit breaker and a GFCI in the same plastic case. It is installed in place of an ordinary breaker in a panelboard and is usually available in 120-volt, 2-wire, or 120/240-volt, 3-wire types which may also be used to protect a 240-volt, 2-wire circuit. The second type provides protection against ground faults and overloads for all outlets on the circuit. A third type having a receptacle and a GFCI in the same housing provides only ground-fault protection to the equipment plugged into that receptacle. There are feed-through types of GFCI which provide protection to equipment plugged into other ordinary receptacles installed downstream on the same circuit.

Ground fault equipment is commercially available from the Square D Company under the catalog designations GROUND CENSOR®, HOMELINE®, QO®, TRILLIANT® and MICROLOGIC® ground fault modules. This ground fault equipment is suitable for protection of main, feeder, and motor circuits on electrical distribution systems. It is also usable as ground fault relay and ground fault sensing devices. The arc detection systems described above can be advantageously used to supplement the circuit protection provided by all the foregoing types of GFCIs.

The term arcing fault, as used herein, includes faults caused by either series arcs (both line and neutral) or parallel arcs (line to line, line to ground, or line to neutral). The term arc, as used herein, includes not only a discharge of electricity through a gas or across an insulating medium, but also high impedance faults or other intended or unintended circuit paths which do not have sufficient energy or current flow to trip a breaker, but nevertheless can generate damaging heat or other undesirable effects.

The term mutual inductance, as used herein, is the property shared by neighboring inductors or inductive devices which enables electromagnetic induction to take place. The term rate of current or voltage change, as used herein, measures the change in the current or voltage over the period in time corresponding to the measurement. The current generates a flux around the conductor which rapidly changes with the fluctuations in current.

While particular embodiments and applications of the present invention have been illustrated and described, it is to be understood that the invention is not limited to the precise construction and compositions disclosed herein and that various modifications, changes, and variations will be apparent from the foregoing descriptions without departing from the spirit and scope of the invention as defined in the appended claims.

What is claimed is:

1. A method of reducing erroneous indications of arcing faults in an arcing fault detection system for an electrical distribution system containing a plurality of branch circuits each having line and neutral conductors for connecting a power source to a load, each of said branch circuits including a sensor responsive to electrical signals on said line conductor for detecting the presence of arcing faults, said method comprising the steps of:

monitoring the electrical signal on the line conductor in each of the branch circuits for the occurrence of an arcing fault;

disconnecting the load from the power source in response to the occurrence of an arcing fault in any of said branch circuits; and blocking signals originating from noisy loads and likely to be mistaken for arcing faults, from said sensor.

2. The method of claim 1 wherein the step of blocking signals originating from noisy loads is accomplished between the sensor and the load in a selected number of branch circuits connected to noisy loads.

3. The method of claim 2 in which the step of blocking signals originating from noisy loads further comprises the step of connecting two capacitors and an inductor between the sensor and the load, each capacitor connecting the line conductor to the neutral conductor, the inductor positioned on the line conductor and between the two capacitors.

4. An apparatus for reducing erroneous indications of arcing faults in an arcing fault detection system for an electrical distribution system containing a plurality of branch circuits each having line and neutral conductors for connecting a power source to a load, each of said branch circuits including an arcing fault detector for detecting the occurrence of an arcing fault in any of said branch circuits and a line interrupter for disconnecting said load from said power source in response to the detection of an arcing fault in that branch circuit; said apparatus comprising blocking means for blocking signals originating from noisy loads and likely to be mistaken for arcing faults, from said arcing fault detector.

5. The apparatus of claim 4 in which the blocking means is positioned between the arcing fault detection and the load in a selected number of branch circuits connected to noisy loads.

6. The apparatus of claim 5 in which the blocking means comprises two capacitors and an inductor, each capacitor connecting the line conductor to the neutral conductor, the inductor positioned on the line conductor and between the two capacitors.

7. A blocking apparatus in an arcing fault detection system for an electrical distribution system containing a plurality of branch circuits each having line and neutral conductors connected between a power source and a load, each of said branch circuits including an arcing fault detector for detecting the occurrence of an arcing fault in any of said branch circuits and a line interrupter for disconnecting said load from said power source in response to the detection of an arcing fault in that branch circuit; said blocking apparatus comprising a blocking impedance connected between the arcing fault detector and the load of a selected number of branch circuits connected to noisy loads and likely to be mistaken for arcing faults.

8. The apparatus of claim 7 in which the blocking impedance comprises two capacitors and an inductor, each capacitor connecting the line conductor to the neutral conductor, the inductor positioned on the line conductor and between the two capacitors.

9. A method of detecting arcing faults and reducing erroneous indications of arcing faults in an electrical distribution system containing a plurality of branch circuits each having line and neutral conductors for connecting a power source to a load, said line conductor carrying an electrical signal between said power source and said load, said method comprising the steps of:
monitoring the electrical signal on the line conductor in each of the branch circuits for the occurrence of an arcing fault with an arcing fault detector;
disconnecting the load from the power source in response to the occurrence of an arcing fault in any of said branch circuits;
electrically isolating the arcing fault to the branch circuit which generated the arcing fault; and
blocking signals originating from noisy loads and likely to be mistaken for arcing faults, from said arcing fault detector.

10. An apparatus for detecting arcing faults and reducing erroneous indications of arcing faults in an electrical distribution system containing a plurality of branch circuits each having line and neutral conductors for connecting a power source to a load, said line conductor carrying an electrical signal between said power source and said load, said apparatus comprising:
an arcing fault detector in each of said branch circuits for detecting the occurrence of an arcing fault in any of said branch circuits;
a line interrupter in each of said branch circuits for disconnecting said load from said power source in response to the detection of an arcing fault in that branch circuit;
isolating means in each of said circuits for electrically isolating the arcing fault to the branch circuit which generated the arcing fault; and
blocking means for blocking signals originating from noisy loads and likely to be mistaken for arcing faults, from said arcing fault detector.

11. An arcing fault detection system for an electrical distribution system including at least two branch circuits each of which has line and neutral conductors connected between a power source and a load, said line conductor carrying an electrical signal between said power source and said load, said arcing fault detection system comprising:
a line interrupter in each of said branch circuits;
a sensor electrically coupled to the line conductor in each of said branch circuits, said sensor being responsive to the electrical signal carried by the line conductor;
an isolating impedance connected between the line and neutral conductors of each of said branch circuits; and
a blocking impedance connected between the sensor and the load of any of said branch circuits connected to a noisy load likely to be mistaken for an arcing fault.

12. A filter for an arcing fault detector in a electrical distribution system connecting a power source to a plurality of loads through load and neutral lines forming multiple branch circuits, the arcing fault detector including a sensor for monitoring the occurrence of an arcing fault in one of the branch circuits, the filter comprising:
means for blocking false arcing fault signals generated by the normal operation of one of the loads, the blocking means connecting to one or more of the branch circuits between the sensor and the load.

13. The filter of claim 12 wherein the blocking means includes two capacitors and an inductor, each capacitor connecting the load line to the neutral line, the inductor connected in series to the load line and positioned between the two capacitors.

14. A plug-in device for a wall receptacle connected to an electrical distribution system connecting a power source to a plurality of loads through circuit interrupters, load lines, and neutral lines forming multiple branch circuits, the electrical distribution system having an arcing fault detection system with a sensor for monitoring the occurrence of an arcing fault in one of the branch circuits, the device comprising:
a housing having walls to enclose an interior space;
an input receptacle extending through the housing walls for receiving the load line and neutral line from a load;
an output terminal extending through the housing for connecting to the wall receptacle; and means for blocking false arcing fault signals generated by the normal operation of the load, the blocking means connecting to the input receptacle and the output terminal, the blocking means positioned in the interior space and between the sensor and the load.

15. The device of claim 14 wherein the blocking means includes two capacitors and an inductor, each capacitor connecting the load line to the neutral line, the inductor connected in series to the load line and positioned between the two capacitors.

16. A method of filtering false arcing fault signals in a electrical distribution system connecting a power source to a plurality of loads through load and neutral lines forming multiple branch circuits, an arcing fault detector including a sensor for monitoring the occurrence of an arcing fault in each of the branch circuits, the method comprising the steps of:

blocking false arcing fault signals generated by the normal operation of one of the loads on one or more of the branch circuits between the sensor and the load for the respective branch circuit.

17. The method of claim 16 wherein the blocking step further comprises connecting two capacitors and an inductor, each capacitor connecting the load line to the neutral line, the inductor connected in series to the load line and positioned between the two capacitors.

* * * * *